(12) United States Patent
Fei et al.

(10) Patent No.: US 8,918,776 B2
(45) Date of Patent: Dec. 23, 2014

(54) SELF-ADAPTING SOFTWARE SYSTEM

(75) Inventors: Mingbiao Fei, Sammamish, WA (US);
Abhinav Mishra, Redmond, WA (US);
Derek Rivait, Redmond, WA (US);
Michael Day, Kirkland, WA (US);
James Aaron Holmes, Sammamish, WA (US); James A. Bennett, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 13/216,623

(22) Filed: Aug. 24, 2011

(65) Prior Publication Data
US 2013/0055237 A1 Feb. 28, 2013

(51) Int. Cl.
*G06F 9/44* (2006.01)

(52) U.S. Cl.
USPC ........................................................ 717/169

(58) Field of Classification Search
USPC .............. 707/7, 9, 999.01; 709/227; 358/402; 386/95; 715/747, 753; 725/34; 463/40; 717/169
See application file for complete search history.

(56) References Cited

U.S. PATENT DOCUMENTS

| | | | |
|---|---|---|---|
| 6,049,612 A | 4/2000 | Fielder et al. | |
| 6,338,152 B1 | 1/2002 | Fera et al. | |
| 6,370,686 B1 | 4/2002 | Delo et al. | |
| 6,757,837 B1 | 6/2004 | Platt et al. | |
| 6,970,866 B1 * | 11/2005 | Pravetz et al. | ........................ 1/1 |
| 7,092,946 B2 | 8/2006 | Bodnar | |
| 7,197,715 B1 * | 3/2007 | Valeria | ........................... 715/747 |
| 7,293,201 B2 | 11/2007 | Ansari et al. | |
| 7,337,427 B2 | 2/2008 | Carrigan | |
| 7,493,614 B2 | 2/2009 | Liu et al. | |
| 7,519,911 B2 | 4/2009 | Friedman | |
| 7,539,652 B2 | 5/2009 | Flinn et al. | |
| 7,716,660 B2 | 5/2010 | Mackay | |
| 7,945,906 B2 | 5/2011 | Bourke-Dunphy et al. | |
| 7,966,612 B2 | 6/2011 | D'Alterio et al. | |
| 2002/0049847 A1 * | 4/2002 | McArdle et al. | .............. 709/227 |

(Continued)

FOREIGN PATENT DOCUMENTS

| CN | 1485732 | 3/2004 |
|---|---|---|
| CN | 101021797 | 8/2007 |

OTHER PUBLICATIONS

Paul Andrew, "A-Z of Free Photoshop Plugins and Filters", Aug. 2009, p. 1-58 <freePlugIns_09.pdf>.*

(Continued)

*Primary Examiner* — Tuan A Vu
(74) *Attorney, Agent, or Firm* — John Jardine; Kate Drakos; Micky Minhas

(57) ABSTRACT

A software system, such as an operating system, that has multiple parts can be deployed to a computing device incrementally, rather than all at once. The software system self-adapts to the user's needs by installing and removing system extensions automatically without user intervention. A core part of the software system is deployed in the computing device, and system extensions are delivered to the computing device when needed. The software system is aware of the system extensions, so they appear to be part of the system, even though they have not yet been downloaded. The system extensions can be delivered to the computing system on demand or over time during idle times of the computing device. Unused system extensions can be removed from the computing device, and can be downloaded again when next needed.

17 Claims, 5 Drawing Sheets

(56) References Cited

U.S. PATENT DOCUMENTS

| | | | |
|---|---|---|---|
| 2002/0059563 | A1 | 5/2002 | Pavlovic et al. |
| 2003/0079216 | A1 | 4/2003 | Drane et al. |
| 2004/0193599 | A1* | 9/2004 | Liu et al. ............................ 707/7 |
| 2004/0236843 | A1 | 11/2004 | Wing et al. |
| 2004/0263914 | A1* | 12/2004 | Yule et al. ..................... 358/402 |
| 2005/0166198 | A1 | 7/2005 | Gigliotti et al. |
| 2005/0246612 | A1 | 11/2005 | Leis et al. |
| 2006/0177198 | A1* | 8/2006 | Jarman et al. ................... 386/95 |
| 2006/0190773 | A1 | 8/2006 | Rao et al. |
| 2007/0033659 | A1 | 2/2007 | Hoche et al. |
| 2007/0050678 | A1 | 3/2007 | Estes et al. |
| 2007/0067297 | A1* | 3/2007 | Kublickis .......................... 707/9 |
| 2007/0168708 | A1 | 7/2007 | McCuller |
| 2007/0260919 | A1 | 11/2007 | Kerner et al. |
| 2007/0294560 | A1 | 12/2007 | Muthukumarasamy et al. |
| 2008/0064501 | A1* | 3/2008 | Patel ............................... 463/40 |
| 2009/0106733 | A1 | 4/2009 | Baek |
| 2009/0210897 | A9* | 8/2009 | Jarman et al. ................... 725/34 |
| 2010/0011243 | A1 | 1/2010 | Locasto et al. |
| 2010/0146325 | A1 | 6/2010 | John |
| 2011/0214021 | A1 | 9/2011 | Vidal et al. |
| 2012/0290950 | A1* | 11/2012 | Rapaport et al. .............. 715/753 |
| 2013/0055237 | A1 | 2/2013 | Fei et al. |

OTHER PUBLICATIONS

Baresi, Luciano et al., "Toward Open-World Software: Issues and Challenges", Computer, Oct. 2006, pp. 36-43, http://ieeexplore/ieee.org/stamp/stamp.jsp?tp=&arnumber=1707632.

"Microsoft APP-V", Wikipedia—Retrieved Date: Jul. 14, 2011, 5 pages http://en.wikipedia.org/wiki/Softgrid.

Microsoft Corporation (n.d.). *Advertisement*. Retrieved Aug. 25, 2011 from http://msdn.microsoft.com/en-us/library/aa367548(d=printer,v=VS.85).aspx.

Microsoft Corporation (n.d.). *Installation-On-Demand*. Retrieved Aug. 25, 2011 from http://msdn.microsoft.com/en-us/library/aa369293(d=printer,v=VS.85).aspx.

Microsoft Corporation (n.d.). *Platform Support of Advertisement*. Retrieved Aug. 25, 2011 from http://msdn.microsoft.com/en-us/library/aa370835(d=printer,v=VS.85).aspx.

CN First Office Action and Search Report for Application No. 201110405228.5, Dec. 25, 2013.

International Search Report and Written Opinion for International Patent Application No. PCT/US20101060013, mailed Nov. 2, 2011.

Chang et al., "Self-healing Strategies for Component Integration Faults," http://www.lta.disco.unimib.it/lta/uploads/papers/Chang-HealigCOTS-ARAMIS-2008.pdf, Nov. 24, 2008 (8 pages).

Ghosh et al., "Self-healing systems—survey and synthesis," Decision Support Systems, 42:2164-2185 (2007), http://www.som.buffalo.edu/isinterface/papers/Self-healing%20systems.pdf.

Montani et al., "Achieving Self-Healing in Service Delivery Software Systems by Case-Based Reasoning," pp. 1-19, Apr. 2008, http://citeseerx.ist.psu.edu/viewdoc/download?doi=10.1.1.78.5439&rep=rep1&type=pdf.

Park et al., "Self-healing Mechanism for Reliable Computing," Int'l J Multimedia and Ubiquitous Engineering 3(2):Apr. 1-10, 2008, http://www.sersc.org/journals/IJMUE/vol3_no2_2008/1%20pp1-10.pdf.

Saha, G. K., "Software—Implemented Self-healing System," CLEI Electronic J 10(2):1-6 (Paper 5), Dec. 2007, http://www.clei/cl/cleiej/papers/v10i2p5.pdf.

* cited by examiner

SELF-ADAPTING SOFTWARE SYSTEM

FIELD OF THE INVENTION

This invention relates to deployment of software systems in computing devices and, more particularly, to methods and systems for installing only part of the software system in a computing device, for downloading non-essential parts of the software system on demand at a later time and for removing unused parts of the software system from the computing device.

BACKGROUND OF THE INVENTION

A software system, such as an operating system, may have multiple component parts and may perform multiple functions in order to satisfy a wide range of user needs. Some component parts of the software system may be utilized in performing two or more different functions. It has been customary to deploy the entire software package to a user computing device, even though a particular user may utilize only a fraction of the available functions. The deployment may involve downloading of the software system from a source server or installing the software system from a removable storage device, such as an optical disk.

The trend in computer storage devices is toward larger capacities. Disk storage in commercial off-the-shelf computers may have capacities of 500 gigabytes or greater. Nonetheless, some users may have smaller storage capacities and/or may have applications and data that require large storage capacities. Accordingly, it is desirable to limit the storage space occupied by software systems, such as operating systems.

SUMMARY OF THE INVENTION

A software system, such as an operating system, that has multiple parts can be deployed to a computing device incrementally, rather than all at once. The software system self-adapts to the user's needs by installing and removing system extensions automatically without user intervention. A core part of the software system is deployed in the computing device, and system extensions are delivered to the computing device when needed. The software system is aware of the system extensions, so they appear to be part of the system, even though they have not yet been downloaded. The system extensions can be delivered to the computing system on demand or over time during idle times of the computing device. Unused system extensions can be removed from the computing device, and can be downloaded again when next needed.

According to a first aspect of the invention, a method is provided for controlling deployment of a software system in a computing device. The method comprises receiving, by the computing device, a core part of the software system, wherein payloads of system extensions of the software system are omitted from the received core part, the core part including basic components and metadata describing the system extensions; receiving, by the computing device, a request to execute a system action that requires at least one system extension of the software system; determining, by the computing device, if the required system extension is installed in the computing device; if the required system extension is determined not to be installed in the computing device, downloading, by the computing device, the required system extension from an external source; and performing, by the computing device, the requested system action using the downloaded system extension.

According to a second aspect of the invention, a computing device is provided. The computing device comprises a processor and a storage device encoded with computer-executable instructions that, when executed by the processor, perform a method for controlling deployment of a software system to the computing device. The instructions are configured to: receive a core part of the software system, wherein payloads of system extensions of the software system are omitted from the received core part, the core part including basic components and metadata describing the system extensions; receive a request to execute a system action that requires at least one system extension of the software system; determine if the required system extension is installed in the computing device; if the required system extension is determined not to be installed in the computing device, download the required system extension from an external source; and perform the requested system action using the downloaded system extension.

According to a third aspect of the invention, a computer-readable storage medium is provided. The computer-readable storage medium is encoded with computer-executable instructions that, when executed by a processor, perform a method for controlling deployment of a software system to a computing device. The method comprises receiving, by the computing device, a request to execute a system action of the software system; determining if all parts of the software system required to execute the requested system action are installed in the computing device; and if one or more parts of the software system required to execute the requested system action are determined not to be installed in the computing device, downloading the one or more required parts of the software system from an external source.

The foregoing is a non-limiting summary of the invention, which is defined by the attached claims.

BRIEF DESCRIPTION OF DRAWINGS

For a better understanding of the present invention, reference is made to the accompanying drawings, which are incorporated herein by reference and in which.

DETAILED DESCRIPTION

The present invention relates generally to deployment of a software system in a computing device. The software system may be an operating system, such as for example Microsoft Windows®, but is not limited to operating systems. In conventional practice, the entire software system is installed in the computing device at one time. According to embodiments of the invention, a core part of the software system is installed in the computing device, and system extensions of the software system are delivered to the computing device when required to perform a system action. The system extensions are parts of the software system that are not basic to its operation. System extensions are not installed in the computing device initially and may be downloaded at a later time, depending on whether the system action performed by the system extension is requested. Unused system extensions can be removed from the computing device, and can be downloaded again when needed.

Figure 1:
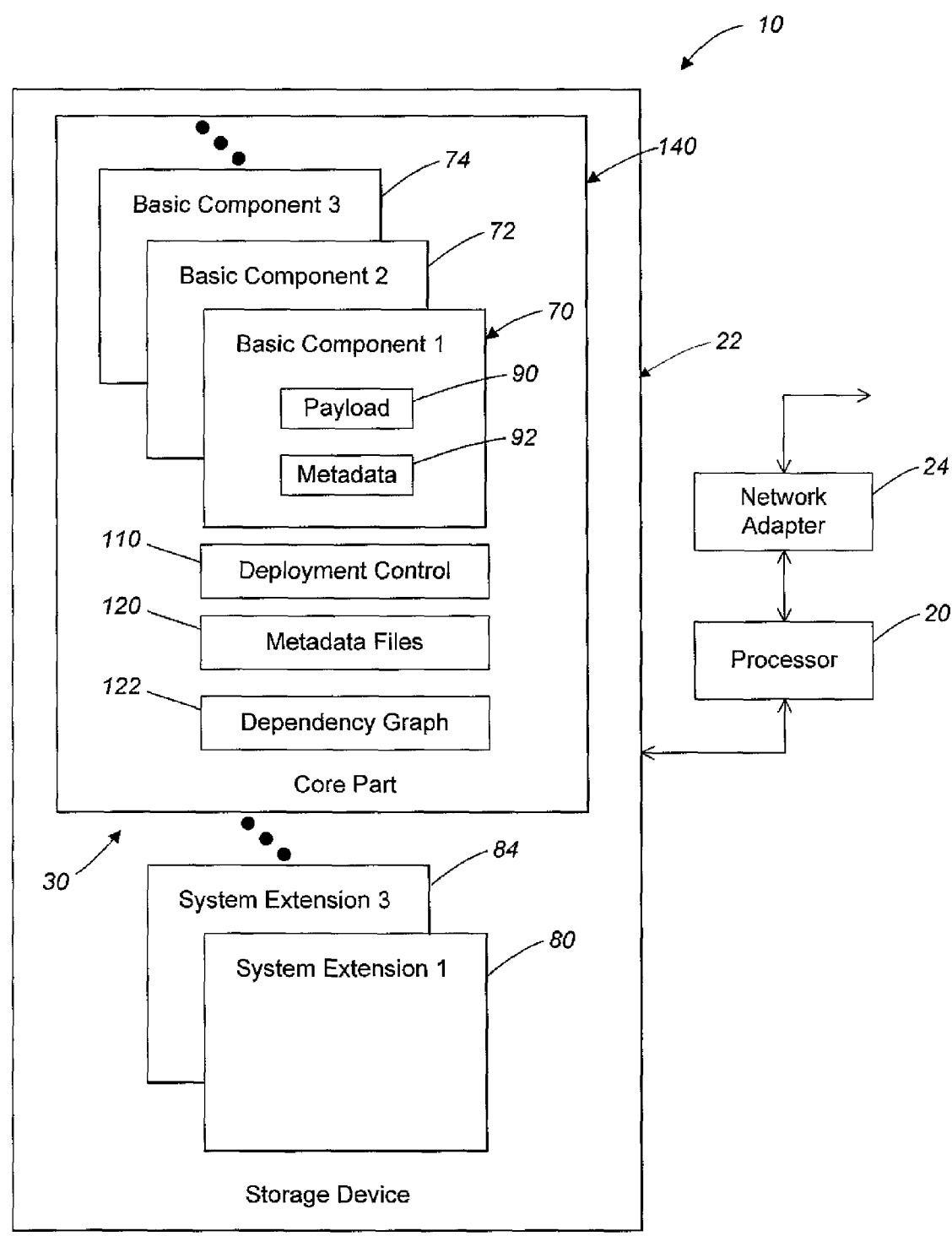
FIG. 1 is a schematic block diagram of an embodiment of a computing device in accordance with embodiments of the invention.

A computing device 10 in accordance with embodiments of the invention is shown in FIG. 1. The computing device 10 may include a processor 20, a storage device 22 and a network adapter 24. It will be understood that the computing device 10 of FIG. 1 is highly simplified in order to illustrate features of the present invention. The storage device 22 contains parts of a software system 30 as described below.

Figure 2:
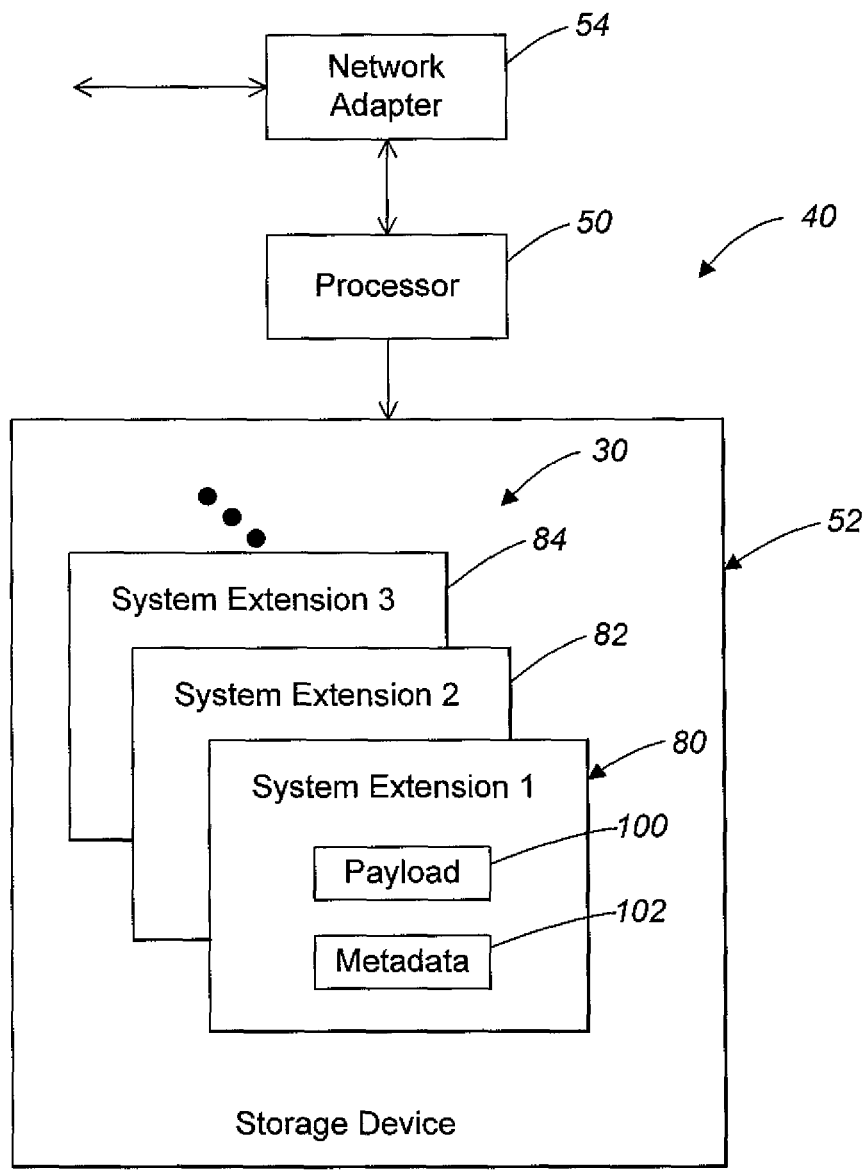
FIG. 2 is a schematic block diagram of an embodiment of an external server in accordance with embodiments of the invention.

An external server 40 in accordance with embodiments of the invention is shown in FIG. 2. External server 40 includes a processor 50, a storage device 52 and a network adapter 54. Storage device 52 contains parts of the software system 30 as described below.

The computing device 10 and the external server 40 may be implemented as shown by way of example only in FIG. 5 and described below. Computing device 10 and external server 40 may communicate via their respective network adapters 24 and 54 for downloading parts of the software system 30.

As shown in FIGS. 1 and 2, parts of software system 30 are contained in storage device 22 of computing device 10 and parts of software system 30 are contained in external server 40. According to embodiments of the invention, the parts of software system 30 in storage device 22 of computing device 10 may not constitute the complete software system 30. Instead, storage device 22 contains the parts of software system 30 required to perform basic system actions and system actions requested by the user of computing device 10. Parts of software system 30 that are not contained in storage device 22 may be available for downloading from external server 40 or from another external source. Storage device 52 of external server 40 contains at least the parts of software system 30 needed to satisfy a request by computing device 10 for missing parts of the software system 30. In a practical situation, storage device 52 may include a complete copy of the software system 30, so as to permit downloading of updates and the like, in addition to downloading of missing parts of software system 30.

Referring again to FIG. 1, storage device 22 contains parts of software system 30, including basic components 70, 72, 74, etc. and system extensions 80 and 84. The basic components 70, 72, 74, etc. include software for performing basic system actions of the software system, such as for example file management, network communication, display, etc. System extensions 80 and 84 include software for performing system actions of the software system that are not basic to its operation, such as for example a calculator or a game. The division of the software system 30 into basic components and system extensions is arbitrary and may be based on a tradeoff between available storage capacity in computing device 10 and the performance overhead associated with downloading system extensions.

Each of basic components 70, 72, 74, etc. includes a payload 90 and a metadata file 92. The payload 90 includes files that are used by the processor 20 of computing device 10 to execute the basic component. These files may include executable files, which may be formatted as dynamically linked libraries. The metadata file 92 stores information about the payload files, such as details regarding dependencies between executables of the component. For example, if one file in payload 90 depends on another file in payload 90, this is explicitly recorded in metadata file 92. Metadata file 92 also includes an identification of the files in payload 90.

Each of the system extensions 80 and 84 includes a payload 100 and a metadata file 102 (FIG. 2). The payload 100 includes files that are used by the processor 20 of computing device 10 to execute the system extension. The metadata file 102 stores information about the payload files. In the example of FIG. 1, system extensions 80 and 84 have been installed in computing device 10, while other system extensions, such as system extension 82 shown in FIG. 2, have not been installed in computing device 10. The installation of system extensions 80 and 84 and the possible removal of one or both of extensions 80 and 84 are discussed below.

The system software 30 further includes metadata files 120 and may include a dependency graph 122. Metadata files 120 include the metadata files of system extensions that are not installed in computing device 10. For example, metadata files 120 include the metadata files 102 of system extension 82 shown in FIG. 2, as well as metadata files of any other system extensions not installed in computing device 10. The metadata files 120 provide a complete description of all parts of the software system 30, including parts of the software system that are not installed in computing device 10 but are available for downloading from an external source. The dependency graph 122 may be used to determine the system extensions required to perform a system action requested by the user, as discussed below.

As further shown in FIG. 1, software system 30 is defined as including a core part 140, which may include basic components 70, 72, 74, etc. and metadata files 120, and may include dependency graph 122. The core part 140 of software system 30 is installed in computing device 10 during initial deployment of software system 30. The core part 140 includes basic components required to perform basic actions of the software system and also includes metadata files 120 containing descriptions of system extensions that are available for downloading from an external source but may not be presently installed in computing device 10. In contrast to core part 140, system extensions 80 and 84 are installed in computing device 10 at a later time or times in response to a user request to perform a system action that requires the respective system extension. Further, one or both of system extensions 80 and 84 may be removed from storage device 22 according to a removal criteria. For example, if the system extension is unused for a prescribed time period, it may be removed automatically. As an alternative to or in addition to automatic removal, one or both of system extensions 80 and 84 may be removed upon user request.

Figure 3:
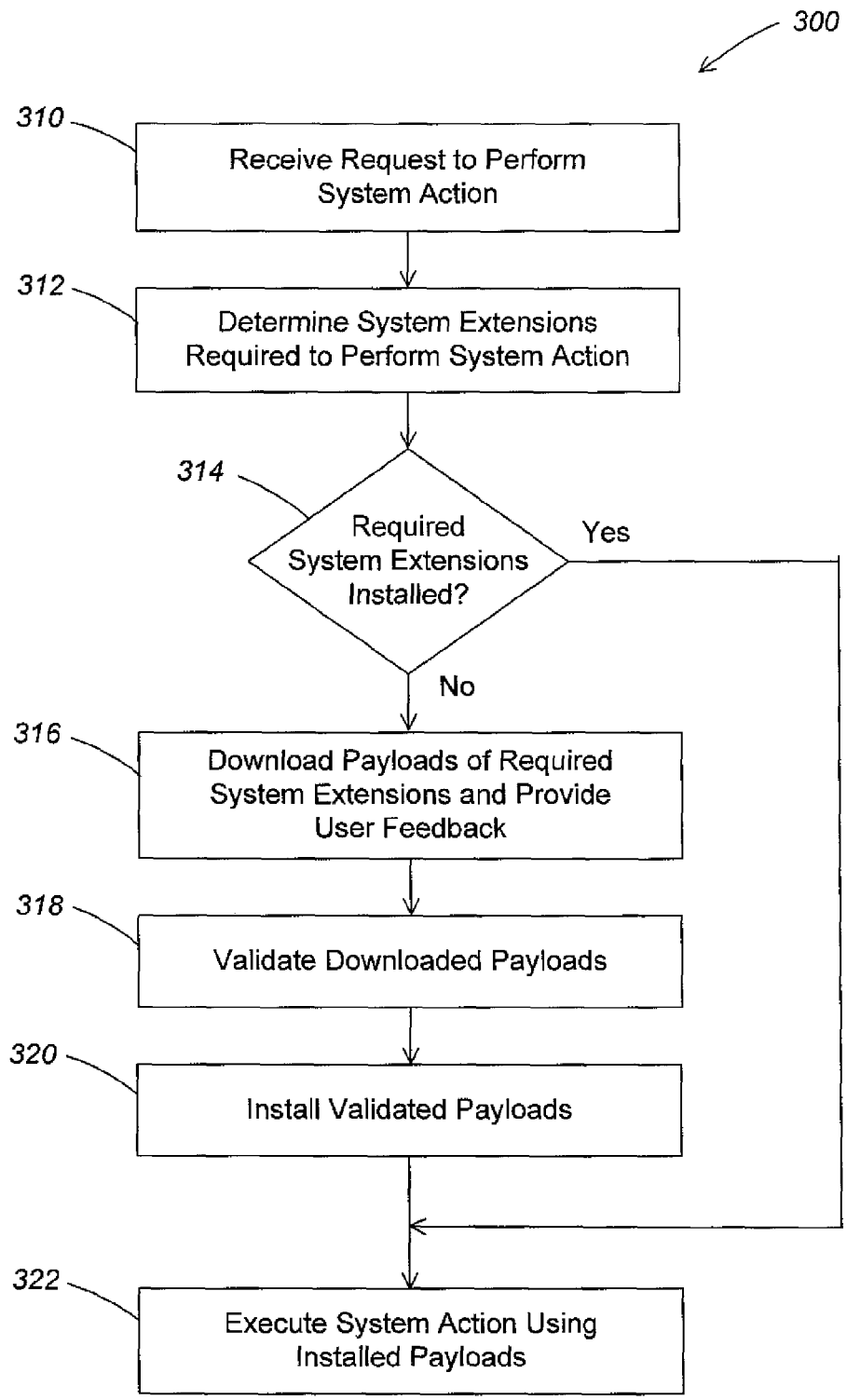
FIG. 3 is a flow chart that illustrates automatic downloading and installing of system extensions of the software system on demand.

A flow chart of a process 300 for downloading and installing system extensions of the software system is shown in FIG. 3. The process may be performed by deployment control module 110 shown in FIG. 1 and described above. It will be understood that the process of FIG. 3 may include additional acts and that the acts of the process may be performed in a different order from that shown in FIG. 3, within the scope of the invention.

In act 310, the software system 30 may receive a request to perform a system action. The request may originate from a user or from another system action being executed by the computing device 10. The request may be based on a variety of triggers, including but not limited to hooking system calls to software subsystems, a trapping process that creates calls to missing parts of the software, and when a user interacts with the missing system extension for example by clicking on a shortcut. In further embodiments, the system extensions may be downloaded in the background during idle system time. The request is directed to the deployment control module 110.

In act 312, deployment control module 110 determines if one or more system extensions are needed to perform the requested system action. As discussed above, system extensions include software for performing system actions of the software system that are not basic to its operation. The system extensions may not be installed in the computing device initially.

In act 314, a determination is made as to whether the required system extensions are installed in the computing device 10. It will be understood that a system action may require one or more system extensions, or may not require a system extension. Each required system extension is determined to be either installed or not installed. If the required system extensions are determined to be installed in the computing device 10, the process proceeds to act 322 and executes the system action using the payloads of the installed system extensions. The required system extensions may have been installed in the computing device 10 in response to a previous request to perform the same system action. If a system extension is utilized frequently enough to avoid being characterized as unused, it may remain in the storage device 22 of computing device 10 indefinitely.

If it is determined in act 314 that the required system extensions are not installed in the computing device 10, the payloads of the required system extensions are downloaded from an external source, such as external server 40 in act 316. As discussed above, the metadata files of system extensions are included in core part 140 of software system 30 and do not require downloading. Instead, only the payloads of the required system extensions are downloaded on demand after initial deployment. The system extensions may be downloaded from a variety of different external sources, including but not limited to peer-to-peer networks, software update services and peer computers.

In addition, the deployment control module 110 may provide user feedback during downloading of system extensions. For example, the user feedback may include a message that indicates "downloading system extensions" and a progress bar. It will be understood that user feedback is not required and may be considered an optional feature of the invention.

In act 318, the downloaded payloads of the system extensions are validated cryptographically using an appropriate security mechanism. In act 320, the validated payloads of the system extensions are installed in storage device 22 and are available for execution. In act 322, the requested system action is executed using the installed payloads of the system extensions.

It will be understood that it may not be practical from a performance standpoint to determine required system extensions to perform every system action. Accordingly, act 312 may be limited to relatively high level system actions and assuming that the downloaded system extension contains software for performing subsidiary system actions related to the high level system action. However, the level of the system action which initiates checking for the required system extensions may be varied within the scope of the invention.

The system extension or extensions required to perform a system action may be determined from dependency graph 122, in accordance with embodiments of the invention. The dependency graph may be in the form of a table which lists system actions and corresponding system extensions required to execute the system action. The dependency graph may further include a flag for each system extension that indicates whether or not the system extension is installed in computing device 10. In other embodiments, similar information may be held in a cache memory of computing device 10 for quick access.

Figure 4:
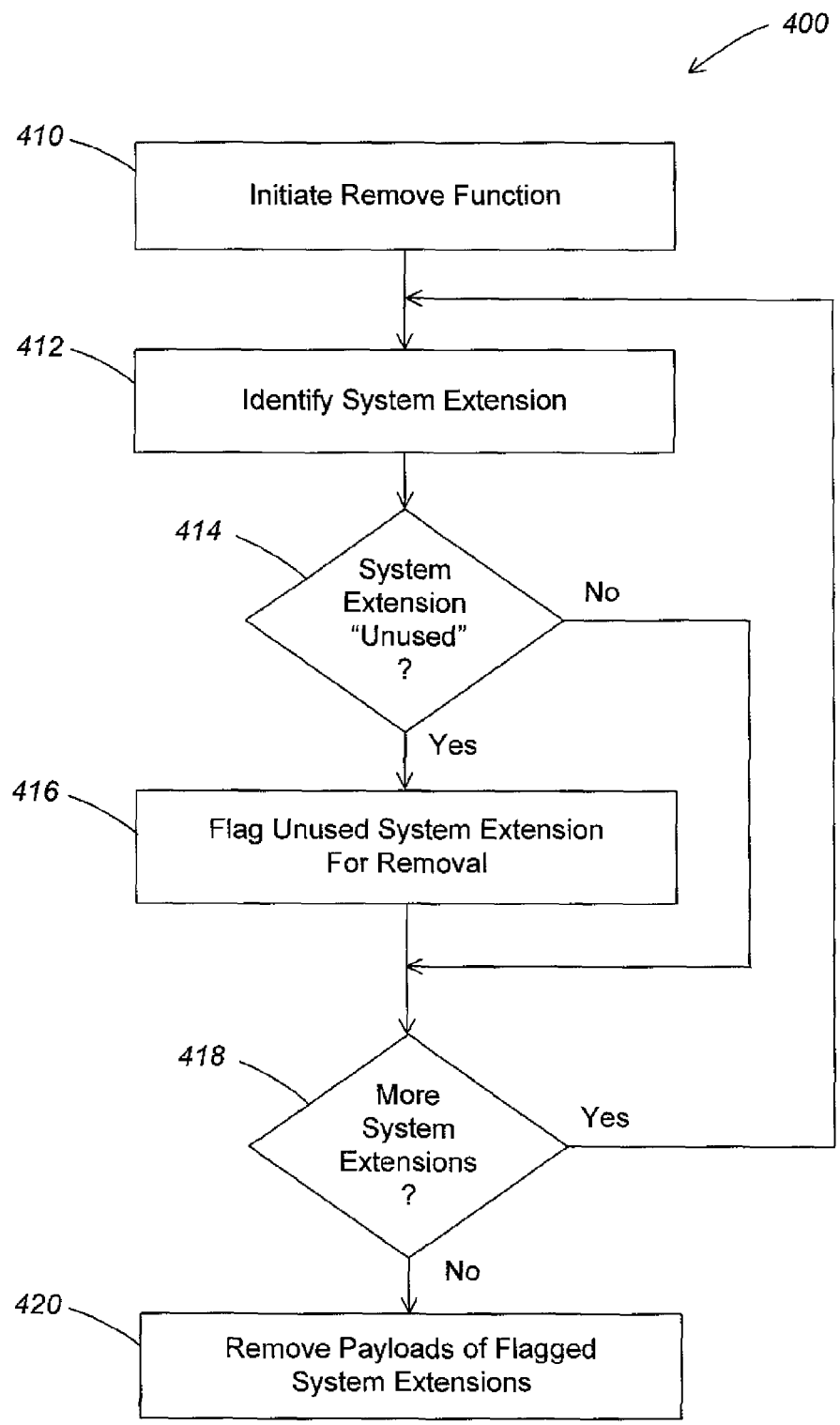
FIG. 4 is a flow chart that illustrates removal of unused system extensions of the software system from the computing device.

A flow chart of a process 400 for removal of unused system extensions is shown in FIG. 4. The process may be executed by deployment control module 110. It will be understood that the process of FIG. 4 may include additional acts and that the acts of the process may be performed in a different order from that shown in FIG. 4, within the scope of the invention.

In act 410, a Remove function is initiated. The Remove function relates to removal of unused system extensions from storage device 22 of computing device 10, so as to make additional storage capacity available. The Remove function may be initiated automatically, such as at the time of user login or after a prescribed number of user logins, during idle times of the computing device 10, or a prescribed time after a previous operation of the remove function. Further, the Remove function may be initiated in act 410 in response to the storage device 22 running low on available storage space, for example, if the available storage capacity drops below a prescribed value. Alternatively or in addition to the above, the Remove function may be initiated by the user, so as to make storage capacity available in storage device 22.

In act 412, installed system extensions of the software system 30 are identified. Since other components of the software system 30 are not removed from computing device 10, they are not identified.

In act 414, a determination is made as to whether the identified system extension is unused. A variety of techniques may be utilized to determine whether the system extension of the software system 30 is "unused." For example, lack of use of the system extension in question for a prescribed time may cause the system extension to be identified as unused. The prescribed time may be elapsed time or may be the time during which the user has been logged onto the computing device 10. In more complex approaches, the number of uses of the system extension can be recorded over time and the system extension can be characterized as unused if the number of uses in a prescribed time falls below a threshold value. It will be understood that different techniques can be utilized to determine whether the system extension is "unused." Further, the criteria for being characterized as "unused" may be programmable.

If the identified system extension is determined in act 414 not to be unused, the process proceeds to act 418 to determine if more installed system extensions require evaluation for removal.

If the installed system extension is determined in act 414 to be "unused", the unused system extension is flagged for removal in act 416. In act 418, a determination is made as to whether more system extensions require evaluation for removal. If additional system extensions require evaluation, the process returns to act 412 to identify an installed system extension for evaluation.

If all installed system extensions have been evaluated, as determined in act 418, the payloads of the flagged system extensions are removed in act 420. As a result, the available capacity of the storage device 22 is increased.

The deployment of the software system 30 thus self-adapts to user needs. The core part of the software system is installed in computing device 10 initially. System extensions are downloaded and installed in computing device 10 automatically in accordance with user needs. Unused system extensions are removed automatically. Thus, the deployment of the software system 30 in computing device 10 increases and decreases automatically in accordance with user needs, thereby self-adapting to user needs. By limiting the installation of system extensions, the self-adapting software system described herein saves storage space in the computing device. Further, the non-installed system extensions do not require service and cannot be used by a virus or a hacker to attack the computing device.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of a computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices.

Figure 5:
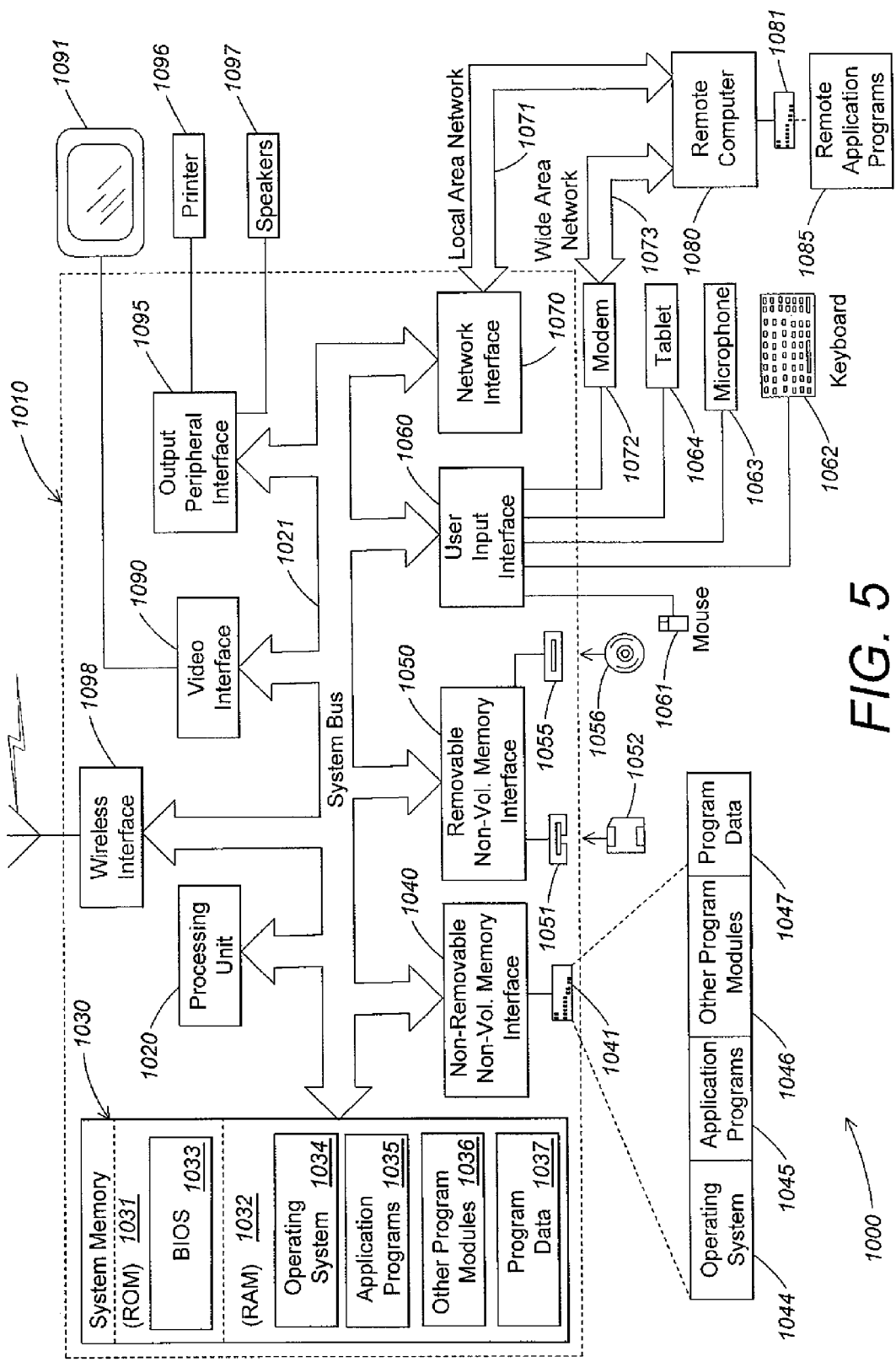
FIG. 5 is a schematic block diagram of an embodiment of a computing device.

With reference to FIG. 5, an exemplary system for implementing the invention includes a general purpose computing device in the form of a computer 1010. The computing device of FIG. 5 can be used for implementing the hosts, the virtual machine manager and any other computing devices described herein. Components of computer 1010 may include, but are not limited to, a processing unit 1020, a system memory 1030, and a system bus 1021 that couples various system components including the system memory to the processing unit 1020. The system bus 1021, may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Combinations of the any of the above should also be included within the scope of computer readable storage media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 5 illustrates operating system 1034, application programs 1035, other program modules 1036, and program data 1037.

The computer 1010 may also include other removable/non-removable volatile/nonvolatile computer storage media. By way of example only, FIG. 5 illustrates a hard disk drive 1041 that reads from or write to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, discussed above and illustrated in FIG. 5, provide storage of computer readable instructions, data structures, program modules and other data for the computer 1010. In FIG. 5, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and pointing device 1061, commonly referred to as a mouse, trackball or touch pad. Other input devices may include a microphone 1063, joystick, a tablet 1064, satellite dish, scanner, or the like. These and other input devices are often connected to the processing unit 1020 through a user input interface 1060 that is coupled to the system bus, but may not be connected by other interface and bus structures, such as a parallel port, game port or a universal serial bus (USB). A monitor 1091 or other type of display device is also connected to the system 1021 via an interface, such as a video interface 1090. In addition to the monitor, computers may also include other peripheral output devices such as speakers 1097 and printer 1096, which may be connected through a output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 5. The logical connections depicted in FIG. 5 include a local area network (LAN) 1071 and a wide area network (WAN) 1073 and a wireless link, for example via a wireless interface 1098 complete with an antenna, but may also include other networks. Such networking environments are commonplace in offices, enterprise-wide computer networks, intranets and the Internet. While wireless interface 1098 is shown directly connected to system bus 1021, it is recognized that the wireless interface 1098 may be connected to system bus 1021 via network interface 1070.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 5 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device comprising:
    a processor and a storage device encoded with computer-executable instructions that, when executed by the processor, perform a method for controlling deployment of an executable software system to the computing device, the storage storing a core part of the software system and metadata, the instructions configured to:
        access and execute the core part of the software system and access the metadata, the metadata describing system extensions and interdependencies between the system extensions and describing associations between system actions and the system extensions, wherein the system extensions of the software system are initially not installed on the computing device;
        automatically monitor the system actions of the software system using the metadata to make a first determination, according to the metadata, that availability of a system extension is to be checked for execution of the software system, wherein the first determination is made by responding to detection of an invocation of a system action by identifying the system extension as being mapped to the detected system action by the metadata, and, according to the identifying of the system extension and the metadata, identifying a second system extension as being needed for the system extension based on interdependency therebetween as indicated in the metadata;
        according to the system extension and the second system extension having been identified, determine that the system extension and the second system extension are not installed on the computing device, and in response thereto download the system extension and the second system extension via a network from a server device;
        perform the requested system action using the downloaded system extension; and
        automatically monitor a storage amount of the computing device and/or automatically monitor an amount of time related to use of the system extension to automatically make a second determination that the system extension is not to be retained on the computing device, and in response to the second determination automatically removing the system extension.

2. A computing device as defined in claim 1, wherein the software system comprises an operating system.

3. A computing device as defined in claim 1, wherein the instructions are configured such that the system extension is removed based on determining that the system extension has not been used since a threshold of time.

4. A computing device as defined in claim 1, wherein the instructions are further configured to remove previously downloaded system extensions in response to respective requests inputted by a user of the computing device.

5. A computing device as defined in claim 1, wherein downloading the system extension is based on metadata describing the system extension.

6. A computing device as defined in claim 1, wherein the instructions are configured to provide feedback to a user with regard to downloading the system extension.

7. A computing device as defined in claim 1, wherein the instructions are configured to automatically remove the system extension based a determination that the computing device is in an idle state.

8. A method of dynamically adapting a software system executing on a computing device, the method performed by the computing device and comprising:
    storing and executing a software system on the computing device, the software system comprising a set of inter-dependent components executable on the computing device, the inter-dependent components comprising core components installed on the computing device and components at least some of which are not initially installed on the computing device;
    accessing first dependency information on the computing device, the first dependency information indicating dependencies between the components of the software system, the components including first components and second components, wherein at least some of the components are both first components and second components, and wherein the first and second components are not initially installed on the computing device;
    accessing second dependency information on the computing device, the second dependency information indicating which actions of the software system require which of the components;
    automatically monitoring the actions of the software system using the second dependency information to automatically make first determinations that the first components, respectively, of the software system are required for execution of the software system and are to be installed to the software system, wherein a first component from said first components is determined to be required according to detection of an action of the software system and according to a determination that the action is mapped by a dependency graph to the first component;
    automatically monitoring use of the software system to make second determinations that the second components, respectively, of the computing device are to be uninstalled from the software system, wherein when a first component is determined to be required for execution of the software system, determining, based on the first component and the dependency information, that the first extension has a dependency relationship with another first component and that the other first extension is not installed, wherein the monitoring includes monitoring for an amount of used or available storage space of the computing device and/or monitoring an amount of time related to use of a second extension;

according to the determinations that, respectively, the first components are to be installed, obtaining the first components via a network from a server device and installing the first components to the software system for execution therewith;

according to the determinations that, respectively, the second extensions of the software system are to be uninstalled, uninstalling the second extensions.

9. A method performed by a computing device to dynamically control which components of a software system are deployed to and removed from the computing device, the method comprising:

executing the software system on the computing device, the software system comprising the components, the components comprising core components and first and second components, wherein which components are deployed to the computing device varies over time and wherein the core components are initially installed on the computing device and the first and second components are not initially installed on the computing device;

accessing dependency information stored on the computing device, the dependency information comprising first dependency information indicating which actions of the software system require which of the components, the dependency information further comprising second dependency information indicating interdependencies between the first components and the second components;

automatically performing first monitoring comprising monitoring the actions of the software system with the dependency information to automatically determine that a detected action is dependent on a first component and that the first component is dependent on a second component by (i) determining based on detection of the action that the action is mapped by the first dependency information to the first component, and by (ii) based on the determining that the action is mapped to the first component, determining that the first action is mapped to the second component by the second dependency information; and based on the determining that the action is dependent on the first component and that the first component is dependent on the second component, determining whether the first component and the second component are deployed on the computing device, and in response to such determining having determined that the first component and the second component are not deployed on the computing device, deploying the first component and the second component to the computing device by downloading the first component and the second component to the computing device via a network from a server device;

executing the action using the downloaded first component to automatically determine that the first component is to be removed from the computing device: automatically performing second monitoring comprising monitoring a storage amount of the computing device and/or monitoring an amount of time related to use of the components of the software system; and in response to the second monitoring determining that the first component is to be removed, automatically removing the first component.

10. A method according to claim 9, wherein the software system comprises an operating system and the components comprise extensions of the operating system.

11. A method according to claim 9, wherein the first dependency information comprises a dependency graph that maps the components to the actions.

12. A method according to claim 9, wherein the second dependency information comprises metadata items representing the components, respectively, wherein some of the metadata items represent components not deployed to the computing device, wherein a given metadata item for a given component indicates files that comprise the given component.

13. A method according to claim 9, wherein the downloading is performed responsive to a determination of idleness of the computing device.

14. A method according to claim 9, wherein the second monitoring comprises automatically monitoring the storage amount of the computing.

15. A method according to claim 9, wherein the second monitoring comprises automatically monitoring the amount of time.

16. A method according to claim 15, wherein the amount of time comprises, or is computed according to, a time when the first component was last executed.

17. A method according to claim 16, wherein the monitoring the amount of time related to use of the first t component comprises determining a number of uses of the first component over a time period that spans the amount of time.

* * * * *